US000001348H

United States Statutory Invention Registration [19]

[11] Reg. Number: H1348

Linville et al.

[43] Published: Sep. 6, 1994

[54] COMBUSTIBLE BED FOR CASKET

[75] Inventors: John E. Linville, 641 Columbia Ave., Osgood, Ind. 47037; Donald R. Maier, 630 E. Mitchell, Cincinnati, Ohio 45217

[73] Assignee: Batesville Casket Company, Inc., Batesville, Ind.

[21] Appl. No.: 72,131

[22] Filed: Jun. 3, 1993

[51] Int. Cl.[5] ..... A61G 17/00
[52] U.S. Cl. ..... 27/5; 27/19
[58] Field of Search ..... 27/19, 2, 5, 29; 5/187, 5/110, 112

[56] References Cited

U.S. PATENT DOCUMENTS

| | | | |
|---|---|---|---|
| 1,820,283 | 8/1931 | Mills | 5/110 |
| 2,121,885 | 6/1938 | Rogers | 27/5 |
| 2,611,908 | 9/1952 | Siggers | 5/187 |
| 2,924,832 | 2/1960 | Knowles | 5/187 |
| 4,752,976 | 6/1988 | Fanning | 5/187 |

*Primary Examiner*—David Brown

[57] ABSTRACT

A combustible bed for a casket including a frame made of a combustible material, namely wood, and a fabric made of a combustible material, namely polypropylene, connected to the frame to provide a surface for supporting a body.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

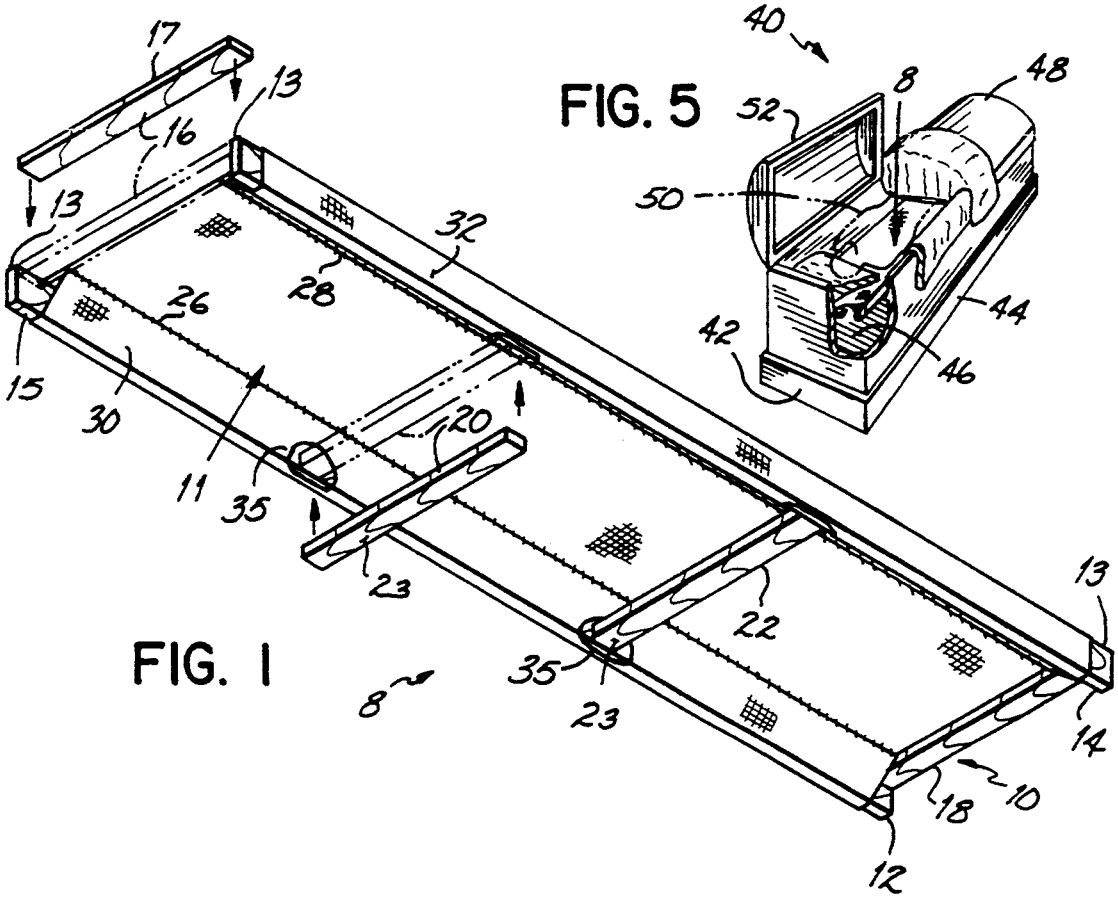
FIG. 1
FIG. 5
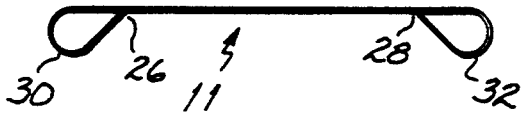
FIG. 2
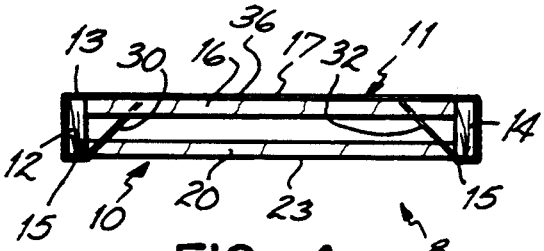
FIG. 4
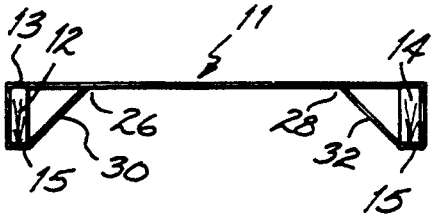
FIG. 3

COMBUSTIBLE BED FOR CASKET

BACKGROUND OF THE INVENTION

1. Field of the Invention

The present invention relates generally to the area of undertaking, and more particularly to a combustible bed for a casket.

2. Description of the Related Art

Current casket beds are made of metal, primarily steel. The metal bed is not consumed during cremation; and therefore, after cremation, it is removed and discarded. During cremation, metal may sear or fuse with pieces of bone which are difficult to separate after cremation. Consequently, for those and other reasons, it is desirable that metal not be included in caskets that are to be cremated.

In addition to the above, there are environmental concerns with regard to the gases emitted during the cremation process, and it is desirable to minimize any noxious gases resulting from the cremation.

Consequently, to address the disadvantages of the current use of metal beds in caskets being cremated, there is a need to provide a combustible bed for a casket.

SUMMARY OF THE INVENTION

To overcome the disadvantages using metal beds in caskets to be cremated, the present invention provides a casket bed which is completely combustible and does not contain any metal components.

According to the principles of the present invention and in accordance with the described embodiments, a casket bed is provided having a frame made of combustible materials and a frame cover also made of combustible materials. The frame cover has each of its longitudinal edges folded over and joined to the cover material along the full length of the longitudinal edge. Consequently, the frame cover has two loops at each longitudinal edge. Frame cross rails are threaded through the loops, and end rails are attached to the cross rails thereby providing a rectangular surface for receiving the body. The frame also has cross rails extending between the sides rails intermediate the end rails to provide additional support.

The above construction provides the advantage of being fully combustible during cremation thereby eliminating the need for post cremation disposal of the bed. In addition, materials for the bed are chosen such that noxious gases created during the cremation process are minimized.

These and other objects and advantages of the present invention will become more readily apparent during the following detailed description taken in conjunction with the drawings herein.

DESCRIPTION OF THE DRAWINGS

FIG. 1 is a bottom perspective view of the bed frame illustrating the assembly of frame members with the frame cover.

FIG. 2 is an end view of the frame cover illustrating the sewn loops at the ends.

FIG. 3 is an end view of the frame of FIG. 1 prior to the addition of end rails and cross rails.

FIG. 4 is an end view of the frame of FIG. 1 and illustrates the relationship of the side rails to the frame cover.

FIG. 5 is a perspective view of the combustible bed supported in a casket.

DETAILED DESCRIPTION OF INVENTION

FIG. 1 illustrates a bed 8 comprised of a frame assembly 10 with cover 11. Side rails 12 and 14 are chosen to have lengths equal to the length of the bed. End rails 16 and 18 are located at the top edge of the ends of the side rails 12, 14 and are positioned such that the top surfaces 17 of the end rails 16 and 18 are flush with the surfaces 13 of the top edges of the side rails 12 and 14. Cross rails 20 and 22 are located intermediate the ends of the side rails 12 and 14 and along their bottom edge. Preferably, the cross rails are positioned such that their bottom surfaces 23 are flush with the surfaces 15 of the bottom edges of the side rails 12 and 14. The side rails, end rails and cross rails are preferably fabricated of wood.

The frame members are joined by combustible commercial plastic fasteners. Such "Christmas tree" fasteners have a barbed shaft in which the barbs are oriented to present little resistance to being inserted in a hole extending between the members to be joined. However, the orientation of the barbs present substantial resistance to motion in the opposite direction thereby securing the members.

FIG. 2 illustrates the frame cover 11 in which its longitudinal edges 26 and 28 are folded back over the frame cover to form loops 30 and 32. The longitudinal edges are maintained in that position by sewing the edges to the cover 11. The frame cover 11 is preferably made of a polypropylene webbing. Preferably, the frame cover 11 is cut to a length such that when assembled on the bed frame 10 the frame cover extends between but does not cover the top surfaces of the end rails 16 and 18. In addition, the loops 30 and 32 have holes 35 cut herein at the location of the cross rails 20 and 22 such that the side rails 12 and 14 are exposed through the frame cover 11 to receive the cross rails 20 and 22.

To assemble the bed 8, as shown in FIG. 3, the side rails 1 2 and 14 are inserted through the loops 30 and 32, respectively, of the cover 11. The side rails 12, 14 are placed on edge and separated to form an assembly similar to that illustrated in FIG. 3. Next, the end rails 16, 18 are inserted between the side rails to the positions illustrated in FIG. 1. The cross rails 20, 22 are then positioned between the side rails as illustrated in FIGS. 1. The end rails 16, 18 and cross rails 20, 22 are connected to the side rails 12, 14 by combustible fasteners as previously described. The fully constructed bed 8 has a surface 36 for supporting a body.

The assembled bed 8 may then be placed in a casket 40 shown in FIG. 5. The casket 40 includes end walls 42, side walls 44, a bottom wall 46 and a top 48 which define a space for receiving a body 50, shown in phantom. The top 48 of the casket 40 includes a lid 52 hinged along a longitudinal side to one of the side walls 44, thereby providing physical and visual access to the casket. The bed 8 may be supported in the casket 40 by support mechanisms known in the art.

While the present invention has been set forth by a description of the embodiment in considerable detail, it is not intended to restrict or in any way limit the claims to such detail. Additional advantages and modifications will readily appear to those who are skilled in the art. For example, the bed frame is preferably wood. However, any other combustible material which satisfies the structural requirements of the bed and whose combustion gasses are environmentally acceptable, may be used. Further, the frame cover is preferably polypropylene webbing. Again, any other cover material which is functionally equivalent and whose combustion gasses are acceptable, may be used. Other materials include natural fabrics such as cotton, or a canvas. Further, the frame construction may vary. For example, the end rails 16, 18 may be rotated 90° so that they extend across the ends of the side rails 12, 14. Similarly, the cross rails 20, 22 may be rotated 90° such that they extend across the height of the side rails 12, 14. Or, further the end rails 16, 18 and cross rails 20, 22 may have the same orientation as illustrated in FIG. 1 or the end rails may have one orientation and the cross rails a different orientation. Fewer or more cross rails may be used. With regard to the frame cover 11, the loops may be formed by stitching the longitudinal edges to the cover or by bonding the longitudinal edges to the cover or by any other means to create the loop.

In the preferred embodiment, the frame cover 11 is fabricated to leave the end rails and cross rails exposed for assembly; however, the frame cover 11 may be manufactured to the full length of the side rails 12 and 14 without holes for the cross rails. In that situation, the end rails and cross rails would be assembled with the frame cover being captured in the joints between the side rails and the end and cross rails. In a further embodiment, the longitudinal edges 26, 28 of the frame cover 11 may be sewn together to form a single loop. The frame 10 is then completely assembled and inserted in the single loop of the frame cover. Therefore, the frame cover would extend completely around the outer perimeter of the frame, and the top and bottom surfaces would appear identical. The invention in its broadest aspects is therefore not limited to the specific details shown and described. Accordingly, departures may be made from such details without departing from the spirit and scope of the general inventive concept described herein.

We claim:

1. A combustible bed for supporting a body in a casket comprising:

a frame made of a combustible material; and a surface made of a combustible material and connected to said frame for supporting the body.

2. The combustible bed of claim 1 wherein said bed is fabricated of wood.

3. The combustible bed of claim 1 wherein said surface is fabricated of polypropylene webbing.

4. A casket comprising:

end, side and bottom walls defining a space for a body;

a lid; and a support made of a combustible material for supporting said body in said space.

* * * * *